United States Patent
Nugent et al.

[15] 3,693,076
[45] Sept. 19, 1972

[54] COMPUTER CONTROLLED RF NOISE AND MODULATION ANALYZER

[72] Inventors: John L. Nugent, Baltimore; Harvey M. Masters, Ellicott City, both of Md.

[73] Assignee: Westinghouse Electric Corporation, Pittsburgh, Pa.

[22] Filed: June 22, 1971

[21] Appl. No.: 155,556

[52] U.S. Cl. ........... 324/57 N, 324/58 R, 324/73 AT, 324/77 B
[51] Int. Cl. ............................................. G01r 27/00
[58] Field of Search .... 324/57 N, 57 H, 58 R, 73 AT, 324/77 B, 77 R

[56] References Cited

UNITED STATES PATENTS

| | | |
|---|---|---|
| 2,901,696 | 8/1959 | Mollfors ................. 324/57 N |
| 2,988,693 | 6/1961 | Billig et al. ............... 324/57 N |
| 3,302,116 | 6/1967 | Free ......................... 324/57 N |
| 3,350,643 | 10/1967 | Webb ..................... 324/57 N |

*Primary Examiner*—Stanley T. Krawczewicz
*Attorney*—F. H. Henson et al.

[57] ABSTRACT

A computer controlled test set capable of measuring FM and AM noise of an RF signal as well as the index of modulation, RF power level and the linearity of a ramped FM signal output from a microwave signal oscillator included in a unit under test.

13 Claims, 1 Drawing Figure

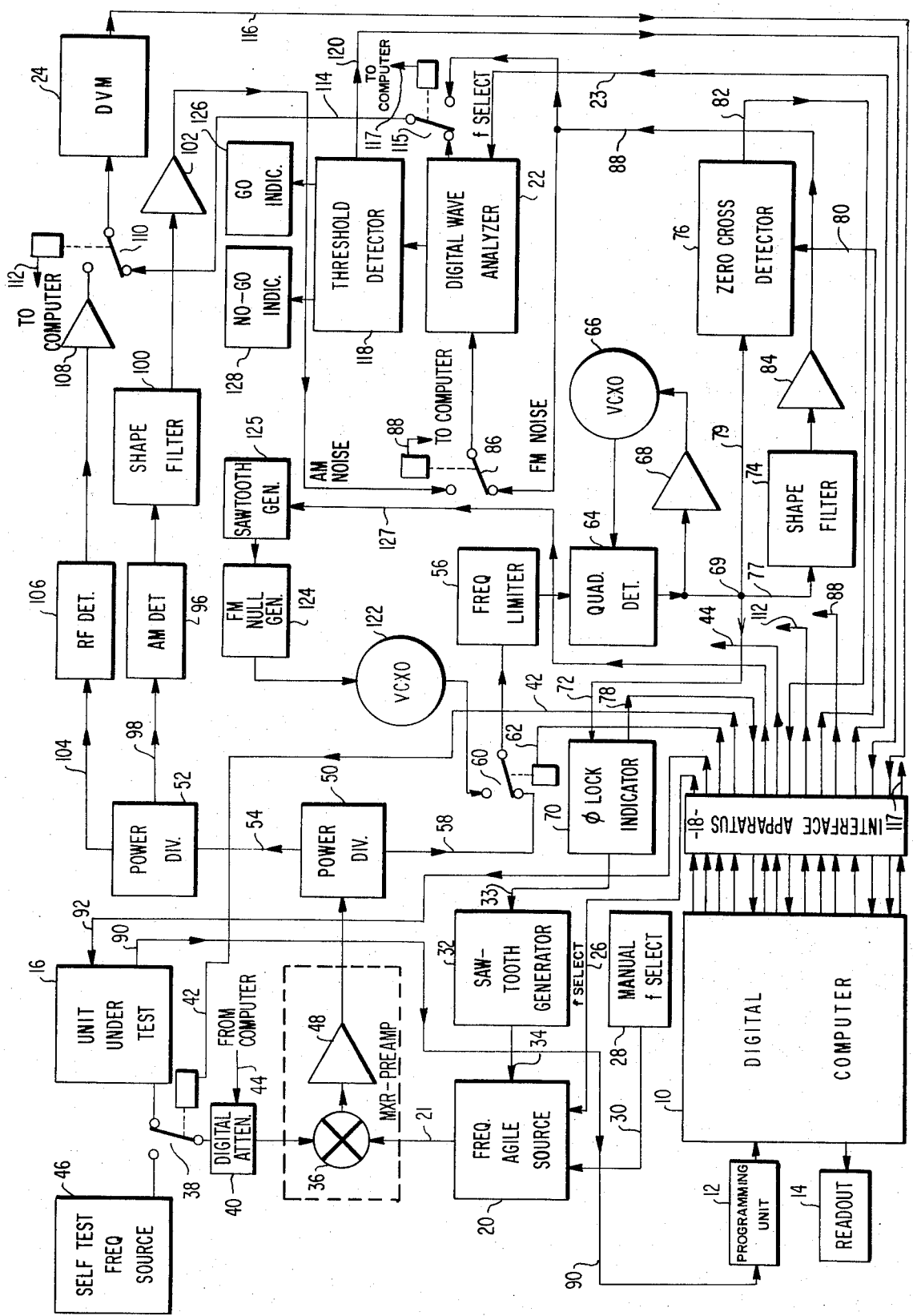

COMPUTER CONTROLLED RF NOISE AND MODULATION ANALYZER

CROSS REFERENCE TO RELATED APPLICATION

The subject invention is related to co-pending U.S. Pat. application No. 155,495, entitled "Digitally Controlled Wave Analyzer" filed in the names of Harvey M. Masters, et al., on June 22, 1971, which application is also assigned to the assignee of the present invention.

BACKGROUND OF THE INVENTION

This invention relates generally to an RF electrical signal measuring system and more particularly to a test set for measuring, inter alia, the noise spectra of microwave signals close to the carrier frequency of a unit under test. The system moreover is coupled to and operated automatically by means of a programmed digital computer which is adapted to interpret the results and provide a readout of the measurements made.

DESCRIPTION OF THE PRIOR ART

While computer controlled test equipment is generally well known, there are no known computer controlled RF signal analyzers which are capable of measuring RF noise and modulation. However, waveform analyzers are known which are controlled by programmers, examples of which are taught in U.S. Pat. No. 3,436,657 issued to A. Popoff and U.S. Pat. No. 3,500,183 issued to S. McCutcheon, et al. RF spectrum analyzers per se are also widely known and used by those familiar with microwave apparatus. Examples of the latter are taught in U.S. Pat. Nos. 3,441,850 issued to J. F. Frazier, et al. and 3,500,193 issued to G. Kemanis.

SUMMARY

It is an object of the present invention to provide a test set capable of performing RF noise and modulation measurements under the control of a digital computer wherein the computer selects the test, causes the test to be performed, processes the results and indicates whether or not a unit under test has failed or is within predetermined tolerance. The test set comprises, inter alia, digital input/output interface circuit apparatus for coupling to and from a general purpose digital computer which is adapted to have a programming unit and a readout device associated therewith. A swept frequency agile source or frequency synthesizer is controlled by the computer, the frequency output of which is fed to a mixer which receives as another input an RF signal from a unit under test. The mixer heterodynes the two signals to produce an IF signal which is fed to a quadrature detector which additionally receives a signal from a voltage controlled crystal oscillator contained in a phase lock loop coupled around the quadrature detector. When phase lock occurs between the IF signal and crystal oscillator, sweeping of the frequency agile source is terminated and an indication is coupled to the computer which then couples the output of the quadrature detector to a digital wave analyzer also under the control of the digital computer. The output of the digital wave analyzer is next fed to a digital voltmeter which is coupled back into the digital computer. A suitable readout of the test results is then provided by the computer. The digital wave analyzer is also coupled to a threshold detector which provides a feedback to the computer indicative of an out of tolerance noise measurement so that the computer can provide a readout of this condition and also the frequency and noise level at which the unit under test failed. The output of the mixer is also coupled by means of a power divider to an AM detector, the output of which is adapted to be coupled back into the digital wave analyzer under the control of the computer for providing a measurement of AM noise as well as FM noise as previously described. An RF detector is also selectively coupled by means of the computer to the digital voltmeter for measuring the RF power level out of the unit under test.

BRIEF DESCRIPTION OF THE DRAWING

The drawing comprises a block diagram illustrative of the preferred embodiment of the subject invention.

DESCRIPTION OF THE PREFERRED EMBODIMENT

Referring now to the drawing, reference numeral 10 designates a general purpose digital computer including a programming unit 12 and a readout device 14 coupled thereto for controlling the operation of the computer and providing a print-out or other indication of the measurements made on a unit under test 16. Digital input/output interface circuit apparatus 18 is coupled between the digital computer 10 and an RF noise and modulation analyzer test set comprising, inter alia, a microwave X-band frequency agile source 20 which may be for example a frequency synthesizer, a digital wave analyzer 22 such as described in the above cross referenced related application, and a digital voltmeter 24 which provides a binary coded decimal output signal which is fed back to the digital computer 10 through the interface apparatus 18. The digital computer 10 is adapted to control or select the output frequency provided by the frequency agile source 20 by means of a command applied thereto over a signal line 26. When desirable, a manual frequency selector 28 can also control the output of the frequency agile source 20 by means of the signal line 30. A sawtooth waveform generator 32 is also coupled to the frequency source 20 by means of signal line 34 for effecting a linear sweep of the output frequency thereof which would include the frequency selected either manually or by the digital computer.

The frequency output from the unit under test 16 is coupled to an RF mixer 36 through a relay 38 and a digitally controlled attenuator 40, both of which are controlled by means of the digital computer 10 by signals applied thereto over signal lines 42 and 44 respectively. The relay 38 also has a second or self-test frequency source 46 connected thereto so that depending upon the condition of the relay 38 as established by the computer 10, either the RF output of the unit under test 16 or the source 46 which may be a fixed calibration frequency source is coupled to the mixer 36 through the attenuator 40. The other input to the mixer 36 comprises the frequency output from the frequency agile source 20. The heterodyned output from the mixer 36 comprises an IF signal which is coupled into an amplifier circuit 48 which is usually referred to as a preamplifier stage. The output of the amplifier 48 is coupled into a first signal power divider 50, one portion of which is fed to a second power divider 52 over circuit means 54 while the other portion is coupled to, for example, a 30MHz IF frequency limiter circuit 56 by circuit means 58 and a second electrical relay 60. Relay 60 is controlled by the digital computer 10 by means of a signal line 62 coupled to its solenoid which operates the movable contactor thereof.

The output of the limiter 56 is fed to one input of a quadrature detector 64 which receives a second input from a, for example, 30MHz voltage controlled crystal oscillator (VCXO) 66 connected in a phase lock loop from the output of the quadrature detector through a second amplifier 68. The output of the quadrature detector 64 at the signal junction 69 is also fed to a phase lock indicator circuit 70 by means of circuit lead 72 as well as a shaping filter 74 and a zero crossover detector 76, by means of signal lines 77 and 79 respectively. The phase lock indicator 70 is adapted to stop the operation of the sawtooth generator 32 when the IF output of the mixer 36 phase locks with the frequency generated by the voltage controlled crystal oscillator 66. At that point both the IF and VCXO output will be 30MHz. The phase lock indicator 70 also feeds a signal back to the computer 10 through the interface apparatus 18 by means of signal line 78 to begin a measurement which will be hereinafter described in greater detail. The zero crossover detector 76 also includes an input signal line 80 for coupling an activation command signal from the computer 10 as well as an output signal line 82 for feeding information back into the computer. The output of the quadrature detector fed to the shaping filter 74 is next coupled to the digital wave analyzer 22 through an amplifier 84 and a computer controlled relay 86 by means of the signal line 88.

The circuitry disclosed thus far and particularly including the quadrature detector 64 and the digital wave analyzer 22 is for purposes of measuring the noise spectra of the unit under test 16. It should also be pointed out that the unit under test 16 is shown for purposes of illustration coupled to the programming unit 12 by means of a signal line 90 for applying a signal thereto indicative of its frequency channel which is then read into the computer 10 for suitably controlling the output frequency of the frequency agile source 20. The computer 10 is also adapted to apply a command signal back to the unit under test 16 by means of the signal line 92, to initiate a linear FM (frequency modulation) ramp of its output frequency whereupon the zero crossover detector 76 counts the number of zero counts produced.

The relay 86 in its other relay position is adapted to couple an AM (amplitude modulation) noise signal to the digital wave analyzer 22 which is developed from the power dividers 50 and 52. More particularly, a portion of the signal fed to the power divider 52 is coupled to an AM detector 96 by means of the signal line 98. The output of the AM detector 96 is fed to a shaping filter 100 and then to the digital wave analyzer 22 through the relay 86 and an amplifier 102.

The other portion of the signal applied to the power divider 52 is coupled by means of a signal line 104 to an RF detector 106 which is coupled to the digital voltmeter 24 by means of an amplifier 108 and a third relay 110 so that the test set circuitry is adapted to measure the RF power level of the output from the unit under test 16. The relay 110 is also adapted to be controlled from the digital computer 10 and this is provided by means of a signal line 112 coupling the interface apparatus 18 to the solenoid of the relay 110.

While the output of the amplifier 108 is coupled to one of the fixed relay contacts of the relay 110, the opposite fixed contact is coupled to the output of the digital wave analyzer 22 by means of the signal line 114 and a computer controlled relay 115 connected thereto via signal line 117. Thus the digital voltmeter 24 is adapted to couple binary coded decimal signals indicative of the output of either the digital wave analyzer 22, the amplifier 84 or the amplified output of the RF detector 106 back to the digital computer 10 through the interface apparatus 18 by means of the circuit line 116. The digital wave analyzer 22 also has its output coupled to a threshold detector 118 whose output is fed back to the computer 10 through the interface 18 by means of the signal line 120 so that the computer 10 can make a judgment on the data fed thereto by the test set apparatus and presenting a readout prepared by the readout apparatus 14 and further control of the automatic test being performed. The threshold detector 118, moreover, is adapted to be coupled to a "go" and "no-go" indicator 122 and 124 respectively which can be viewed by an observer monitoring the apparatus.

As an additional means of calibrating the test set, a second voltage controlled crystal oscillator 122 is adapted to be coupled to the quadrature detector 64 through the limiter 56 and the relay 60. The voltage controlled oscillator 122 is varied in frequency by means of an FM null generator circuit 124 which receives an input from a sawtooth generator 125 which provides a linear ramp signal upon command from the computer 10 by way of a command signal coupled thereto over signal line 127. When the correct null is detected by the computer the ramp signal is made to stop at that point.

The subject apparatus disclosed in the drawing is capable of performing a plurality of test measurements on the unit under test 16 under the complete control of the digital computer 10 which not only sends commands to the various system components, but receives the output from the digital voltmeter 24, interprets the results and provides a printed readout or other indication from the readout means 14. For example, the RF power level of the unit under test 16 may be made as well as the measurement of FM and AM noise. Also the frequency output from the unit under test can be frequency modulated according to a linear ramp function sent from the computer. And finally, the index of modulation can be calculated along with a suitable readout thereof.

In operation, the unit under test 16 is connected to the test set and power is applied. The programming unit 12 can, when desirable, instruct the digital computer 10 to activate relay 38 over circuit lead 42 in order to first couple the self-test frequency source 46 to the apparatus for calibration purposes. Assuming for sake of example that the frequency agile source 20 operates in the X-band of microwave frequencies, the self-test frequency source would also be comprised of an X-band oscillator but offset by 30MHz from the frequency agile source. The other calibration feature provided consists of a voltage controlled crystal oscillator 22 which may be for example a 30 megahertz oscillator which can be coupled into the system through the computer operated relay 60.

Following one or more calibration procedures, the digital computer 10 is instructed to couple the output of the unit under test into the test set by means of the relay 38. Meanwhile, the frequency output or channel number of the unit under test is read into the computer 10 via the programming unit 12. This is shown in the present embodiment by means of the electrical signal line 90. This is disclosed merely by way of illustration, since it can equally be done manually when desirable without departing from the spirit or scope of the invention. Having read the channel number of the unit under test 16 into the computer 10, the computer selects appropriate X-band oscillators, not shown, in the X-band frequency agile source 20 and connects them to the mixer 36 by means of the signal line 21. The output of the mixer 36 comprises an IF signal which is to be phase locked with the fixed frequency output of, for example, 30MHz from the voltage controlled crystal oscillator 66. The sawtooth generator 32 accordingly sweeps the frequency output of the frequency agile source 20 until a substantially 30MHz IF signal is provided out of the mixer 36 whereupon phase lock occurs at the output of the quadrature detector 64 which output is sensed by the phase lock indicator circuit 70. At this time a "stop sweep" signal is applied to the sawtooth generator 32 over signal line 33. Simultaneously, an output indicative of phase lock is coupled back to the computer 10 through the interface apparatus 18 over circuit lead 78 indicative of a "begin measurement" command to the computer. The computer next responds by suitably operating the relay 110 to couple the RF detector 106 to the digital voltmeter 24 by way of the amplifier stage 108. The digital voltmeter output comprising a binary coded decimal signal indicative of an RF power level of measurement is fed back to the computer over circuit line 116. Following this the computer 10 commands the digitally controlled attenuator 40 located between the unit under test 16 and the mixer 36 to step in 2db increments by means of a signal applied thereto over signal line 44 until a preset signal level is read by the digital voltmeter 24. This sets the input power from the unit under test 16 to the mixer 36 and is a direct measurement of the output power of the unit under test, i.e., the amount of attenuation necessary to reach the preset level.

Following a measurement of the output power level an FM noise measurement is next performed. The digital computer 10 suitably operates relay 86 by means of a signal applied over circuit lead 88 to connect the digital wave analyzer 22 to the output of the amplifier 84 which is coupled from the output of the quadrature detector 74 through the shaping filter 74. The operation of the quadrature detector 64 acts to cancel the RF carrier frequency so that the output which is applied to the filter 74 comprises a noise signal ranging anywhere from DC to some incremental frequency e.g., 1MHz on either side of the carrier frequency. Next the digital computer 10 steps the frequency produced by the digital wave analyzer 22 across a selected frequency band of interest by means of a command signal applied thereto over the signal line 23. The digital wave analyzer feeds its output through the relays 115 and 110 to the digital voltmeter 24 at each frequency step. The computer reads the binary coded decimal output from the digital voltmeter 24 and records the level of noise with respect to the frequency at each frequency. Also the computer 10 provides a print out at the readout device 14 of a permanent record of frequency vs. noise level of the unit under test 16.

As noted earlier, the digital wave analyzer 22 also has its output coupled to the threshold detector 118. The threshold detector is also coupled back to the computer by means of a signal line 120 so that the computer monitors the threshold detector which is preset to indicate an out of tolerance noise measurement. An out of tolerance reading activates the "no-go" indicator 128 and signals the computer over signal line 120 that the unit has failed. The computer then prints out the frequency at which it failed and the noise level appearing thereat. Also when desirable, the entire noise spectrum can be read out of the computer from the reading provided by the digital voltmeter 24 which can then be stored in the computer upon command.

With the FM noise measurement being made, the subject test set is also adapted to measure the AM noise which is accomplished by the computer operating the relay 86 such that the AM detector 96 is coupled to the digital wave analyzer through the filter 100 and the amplifier stage 102. Again the computer steps the digital wave analyzer 22 in frequency steps across a predetermined frequency band with the output being measured by the digital voltmeter 24 and fed into the computer for providing a readout similar to that explained with respect to the Fm noise measurement.

When and if the linearity of a ramp controlled frequency modulation output from the unit under test 16 is desired to be measured, a command to start a linear FM ramp is applied to the unit under test 16 by way of the signal line 92 and a signal for activating the zero crossover detector 76 is applied over circuit line 80. As the FM output of the unit under test occurs as a result of the linear ramp function applied thereto, the zero crossover detector 76 measures the output of the quadrature detector 64 and more particularly the first order sideband whereupon the computer 10 counts the number of zero counts produced. The computer also during this time period calculates the peak deviation, decides on an in or out of tolerance condition. If the linearity of the FM output is out of tolerance, the deviation can be printed out for modifying the unit under test 16.

Finally, the FM index of modulation can be measured by the computer suitably operating the relay 115 and coupling the amplifier 84 directly to the digital voltmeter 24 through the relay 110 which is also suitably operated to provide a closed signal path for the output of the quadrature detector 64. The digital voltmeter 24 again couples its output to the computer 10 over signal line 116. The computer reads the digital input signal corresponding to the voltage measured, calculates the index of modulation and then prints out a record of the index of modulation.

What has been shown and described, therefore, is a microwave test set capable of performing RF noise and modulation measurements on a unit under test under the automatic control of a programmed digital computer. The computer selects the test, causes the test to be performed, processes the results and makes the decision as to whether the test is within or out of predetermined tolerances.

Having disclosed what is at present considered to be the preferred embodiment of the subject invention,

We claim as our invention:

1. A system controlled by means of a digital computer for making noise spectrum analysis and other related tests upon a unit under test providing an RF output, comprising in combination:

a variable RF frequency source including means for having the output frequency thereof externally controlled;

computer interface apparatus intercoupling said variable frequency source to said digital computer, said computer operating to select the frequency output from said variable RF frequency source;

an RF mixer coupled to the outputs of said variable RF frequency source and to said unit under test, respectively, for providing an IF signal resulting from heterodyning the RF frequency outputs therefrom;

a frequency limiter means coupled to the output of said mixer for providing an output corresponding substantially to a predetermined IF frequency;

a controlled frequency source adapted to operate within the range of said predetermined IF frequency;

detector circuit means coupled to and responsive to inputs from said limiter means and said controlled frequency source and being operable to cancel the IF frequency and provide an output comprising a noise signal;

a phase lock loop circuit coupled between the output of said detector circuit means and said controlled frequency source, being responsive to the output of said detector to generate and apply a control signal to said controlled frequency source for phase locking the output of aid controlled frequency source to said predetermined IF frequency;

a sweep generator coupled to said variable RF frequency source for selectively varying the output frequency thereof over a predetermined frequency range which includes the output frequency of the unit under test;

first circuit means coupled to and responsive to the output of said detector circuit means for generating an output signal indicative of phase lock and including means coupling the output signal corresponding to phase lock to said computer and to said sweep generator for deactivating the sweep upon the occurrence of phase lock;

spectrum analyzer means coupled to the output of said detector circuit and controlled by said computer for providing a signal selectively indicative of the spectral characteristics of said noise signal;

second circuit means coupled to the output of said spectrum analyzer for measuring the spectral characteristics of said noise signal and providing a signal corresponding thereto to said computer whereby said computer provides a suitable readout.

2. The invention as defined by claim 1 wherein said detector circuit means comprises a quadrature detector.

3. The invention as defined by claim 2 wherein said variable RF frequency source comprises a frequency synthesizer and said sweep generator comprises a sawtooth generator for varying the frequency output of said synthesizer linearly over a predetermined frequency range as determined by said digital computer.

4. The invention as defined by claim 2 and wherein said spectrum analyzer comprises a digital wave analyzer.

5. The invention as defined by claim 4 wherein said second circuit means comprises a digital voltmeter providing an output to said computer comprising a binary coded decimal signal.

6. The invention as defined by claim 5 and additionally including an IF signal power divider coupled to the output of said RF mixer, having a first and a second output branch and wherein said first branch is coupled to said frequency limiter means.

7. The invention as defined by claim 6 and additionally including RF detector means coupled to said second output branch of said power divider and including circuit means coupling the output of said RF detector means to the input of said digital voltmeter.

8. The invention as defined by claim 6 and additionally including an AM detector coupled to said second output branch and including circuit means for being selectively coupled to said digital wave analyzer.

9. The invention as defined by claim 8 and additionally including a first signal shaping filter and a first amplifier means coupled between the output of said quadrature detector and the input to said digital wave analyzer, and a second signal shaping filter and a second amplifier coupled between the output of said AM detector and said input to said digital wave analyzer.

10. The invention as defined by claim 1 and additionally including a digitally controlled signal attenuator coupled between the unit under test and said RF mixer and additionally including means coupled to said digital computer for being controlled thereby to step the attenuator in selective increments of attenuation.

11. The invention as defined by claim 1 wherein said voltage controlled frequency source comprises a voltage controlled crystal oscillator and wherein said phase lock loop circuit includes amplifier means coupled between the output of said detector circuit means and the crystal oscillator whereby the output of said amplifier means applies a control voltage to said crystal oscillator.

12. The invention as defined by claim 1 wherein said spectrum analyzer means comprises a digital wave analyzer including a circuit connection back to said computer interface apparatus for being controlled by said digital computer, and additionally including threshold detector means coupled to the output of said digital wave analyzer, being adapted to provide an output signal upon detecting a predetermined amplitude signal from said wave analyzer.

13. The invention as defined by claim 1 and additionally including:

a circuit connection between said digital computer and said unit under test through said interface apparatus for varying the output frequency of said unit under test over a predetermined frequency range; and a zero crossover detector having a circuit connection from said digital computer through said interface apparatus for being activated by said computer simultaneously with the signal applied to the unit under test for varying its output frequency, said zero crossover detector additionally being coupled to the output of said detector circuit means to couple a signal back to said computer through said interface apparatus corresponding to the number of zero counts produced over the frequency range output of said unit under test.

* * * * *